(12) United States Patent
Cleveland

(10) Patent No.: US 8,395,295 B2
(45) Date of Patent: Mar. 12, 2013

(54) LAMINATED SHEET WINDING

(75) Inventor: Mark A. Cleveland, Westminster, CA (US)

(73) Assignee: The Boeing Company, Chicago, IL (US)

(*) Notice: Subject to any disclaimer, the term of this patent is extended or adjusted under 35 U.S.C. 154(b) by 312 days.

(21) Appl. No.: 12/901,007

(22) Filed: Oct. 8, 2010

(65) Prior Publication Data

US 2012/0086296 A1 Apr. 12, 2012

(51) Int. Cl.
*H02K 1/22* (2006.01)
*H02K 3/04* (2006.01)
*H02K 15/04* (2006.01)

(52) U.S. Cl. ........... 310/179; 310/208; 310/268; 29/596

(58) Field of Classification Search .................. 310/179, 310/208, 268; 29/596; *H02K 1/22, 3/04, H02K 15/04*
See application file for complete search history.

(56) References Cited

U.S. PATENT DOCUMENTS

| | | | | |
|---|---|---|---|---|
| 1,789,129 A | * | 1/1931 | Apple | 310/201 |
| 3,091,715 A | * | 5/1963 | Henry-Baudot | 310/268 |
| 3,209,187 A | * | 9/1965 | Wilhelm Angele | 310/266 |
| 3,431,638 A | * | 3/1969 | Burr | 29/598 |
| 3,450,909 A | * | 6/1969 | Burr | 310/58 |
| 3,450,918 A | * | 6/1969 | Burr | 310/268 |
| 3,500,095 A | * | 3/1970 | Keogh | 310/268 |
| 5,451,825 A | * | 9/1995 | Strohm | 310/178 |
| 7,631,413 B2 | * | 12/2009 | Bullock et al. | 29/596 |
| 2005/0231056 A1 | * | 10/2005 | Graham et al. | 310/156.08 |
| 2012/0086296 A1 | * | 4/2012 | Cleveland | 310/179 |

* cited by examiner

*Primary Examiner* — John K Kim
(74) *Attorney, Agent, or Firm* — Hope Baldauff Hartman, LLC

(57) ABSTRACT

Apparatuses, systems, and methods provide for high density laminated sheet windings in axial and radial flux configurations. According to embodiments described herein, motor components such as a rotor or stator include a number of stacked sheets of conductive material. The stacked sheets are electrically connected in series to create a winding. Each motor component includes a number of conductors spaced apart with apertures between. The motor components are stacked and configured with the conductors of one rotor or stator positioned within the apertures of the other rotor or stator to create a thin, high density conductor. A magnemotive force is created when the magnetic flux is positioned over the conductors.

23 Claims, 9 Drawing Sheets

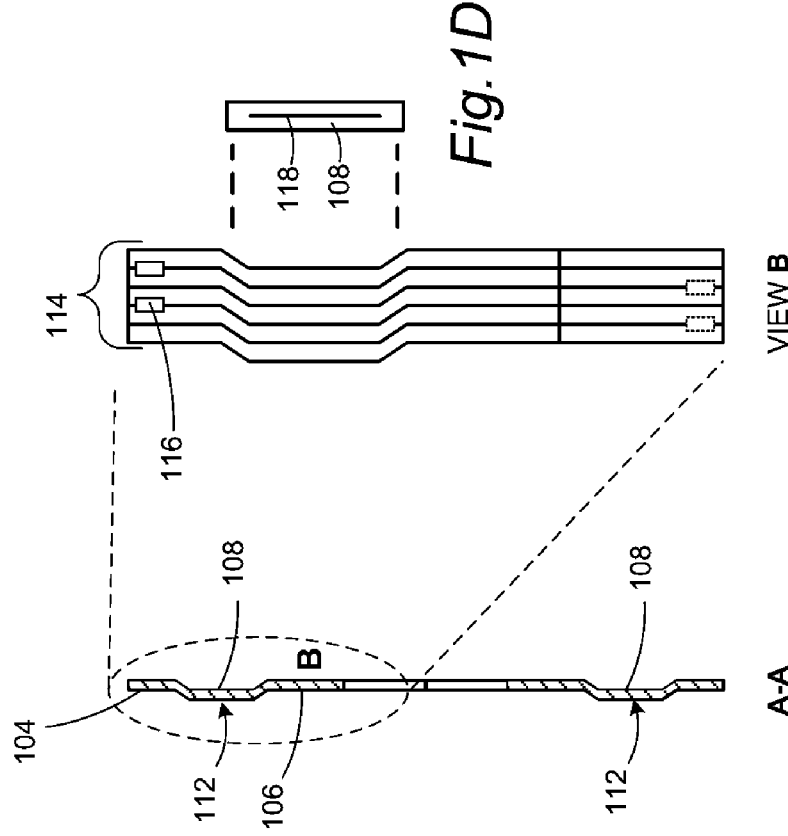
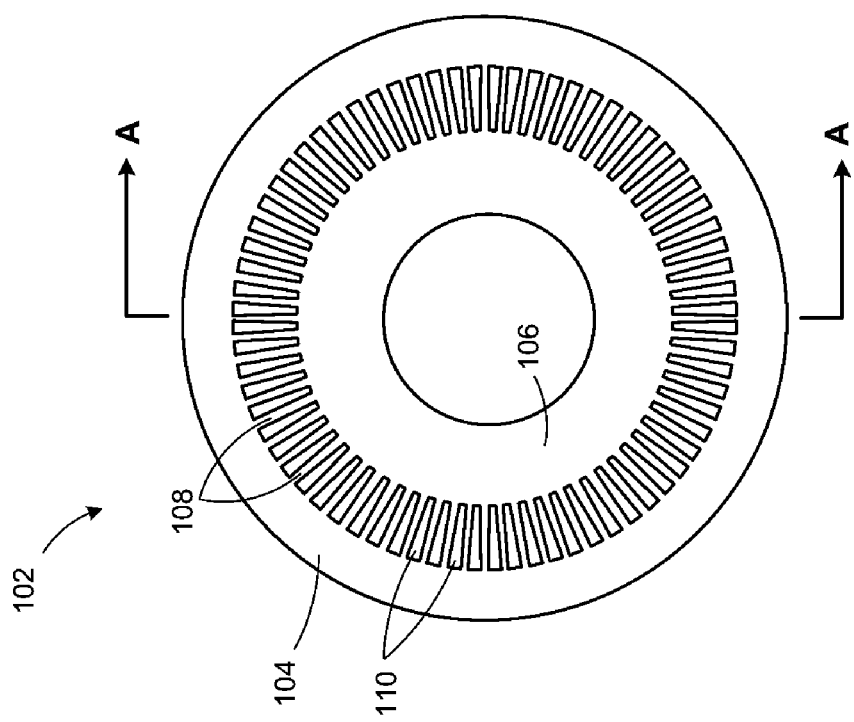

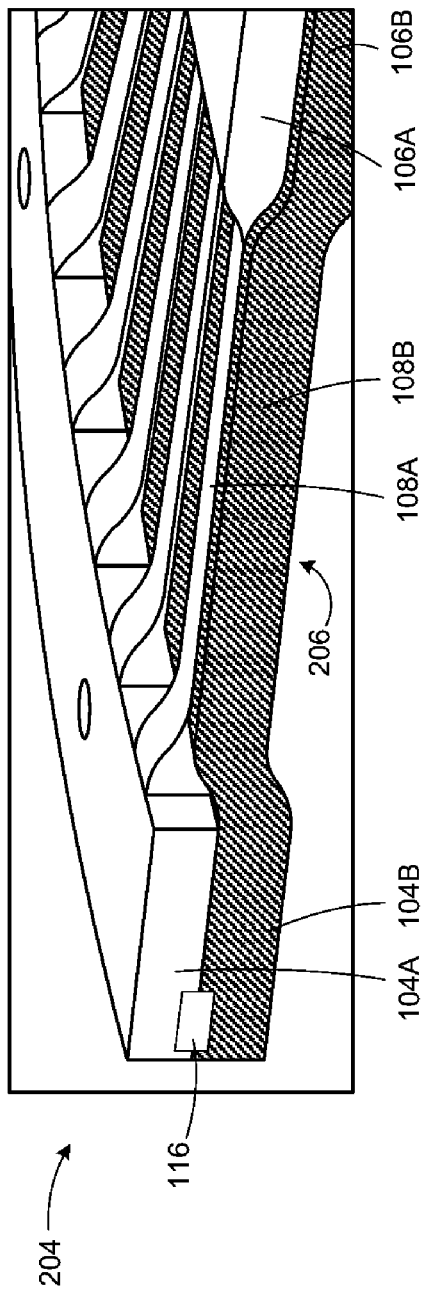
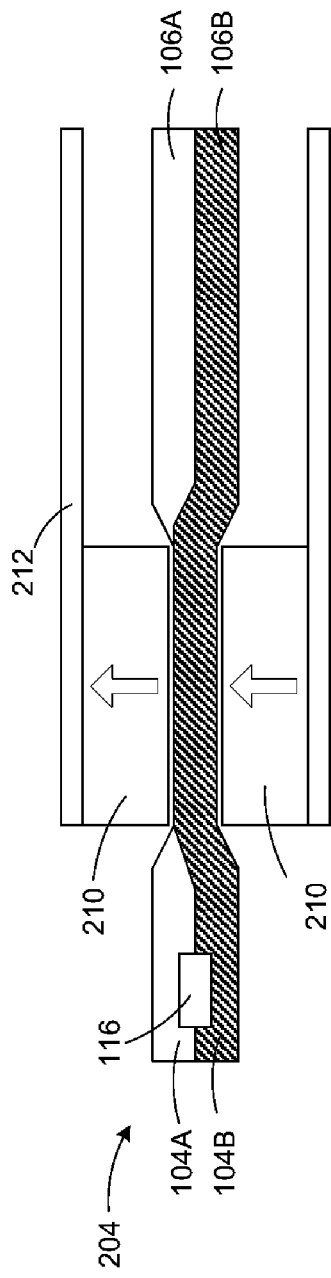

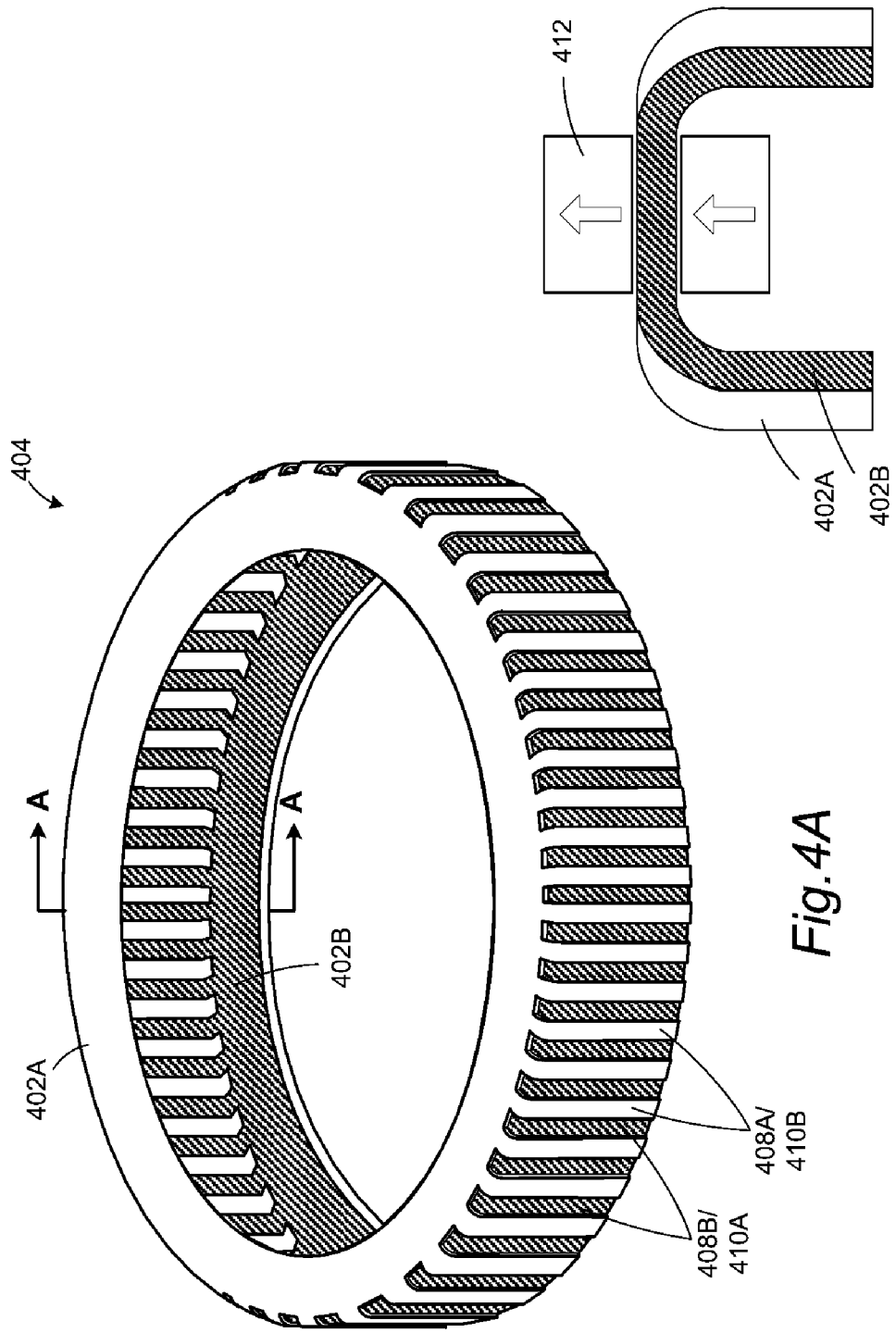

LAMINATED SHEET WINDING

BACKGROUND

Motors commonly utilize rotors and stators, at least one of which typically includes windings consisting of copper wire wound tightly around an iron core. When rotated within a magnetic field or introduced to a rotating magnetic field, the resulting induction motor produces torque. While these iron-cored motors can be very powerful and even relatively efficient, there are limitations. The iron-cored configuration can be heavy when used within a motor designed for use on an aircraft or other vehicle where weight is a significant concern. Additionally, the windings do not allow for efficient packing densities when coils are stacked together. Stacking coils creates larger air gaps that lower the efficiency of the motors due to the decreased amount of coils that can be exposed to a given magnetic flux within a defined area of the stator or rotor containing the winding.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatuses, systems, and methods described herein provide for laminated sheet motor windings. According to one aspect of the disclosure provided herein, an ironless core laminated sheet winding includes two motor components stacked together to create the alternating poles of a winding. The motor components may be configured as a rotor or a stator. Each motor component includes a number of stacked sheets of conductive material. The stacked sheets are electrically connected in series to create a winding. Each motor component includes a number of conductors spaced apart with apertures between the conductors. When the components are stacked together, the conductors of one motor component are positioned within the apertures of the other component to create a substantially continuous, thin conductor area of an axially configured sheet winding.

According to another aspect, an ironless core radial flux motor system includes a pair of end connectors connected to a central hub. The end connectors face one another and are circular, around a central axis with the hub in the center, or what is referred to as a "slip ring". Two conductor sheets span between and are connected to the end connectors. Each conductor sheet includes a number of parallel conductors spaced with apertures between them. The sheets are positioned within the motor system so that the conductors of each conductor sheet fit within the apertures of the other conductor sheet. Doing so creates a substantially continuous outer surface of a circular, radially configured rotor or stator.

According to yet another aspect, an ironless core radial flux motor system includes opposing end connectors connected to a central hub at a slip ring. Two conductor sheets span between and are connected to the end connectors. Each conductor sheet includes a number of parallel conductors spaced with apertures between them. The sheets are positioned within the motor system so that the conductors of each conductor sheet fit within the apertures of the other conductor sheet. The conductor sheets are each configured to conduct electrical current in a spanwise direction normal to the radial axis of the circular rotor or stator. The direction of the current alternates from one conductor to the next conductor.

Another aspect of the disclosure includes a method for manufacturing an ironless core laminated sheet winding. According to the method, a number of motor component sheets that will be stacked together to create a motor component are cut from a sheet of conductive material. A number of conductors are formed within each of the motor component sheets in a configuration in which the conductors are spaced apart with apertures between. The sheets are stacked together and connected in series to create the motor component. The process is repeated to create a second motor component. The two components are secured together with the conductors of one component positioned within the apertures of the other component to create the alternating poles of a motor winding.

According to another aspect, a pair of annular end connectors is mounted to a central hub. A first group of parallel conductors is mounted to the end connectors in a position normal to a radial axis of the end connectors. A second group of parallel conductors is mounted to the end connectors adjacent to the first group of conductors so that each conductor of the second group abuts a conductor from the first group along a spanwise edge of the conductor. The conductors of each group are electrically connected to conduct electrical current in a spanwise direction normal to the radial axis of the end connectors, with the direction of the current alternating between consecutive conductors.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

FIG. 1A is a top view of a rotor disk of a laminated sheet winding according to various embodiments presented herein;

FIG. 1B is a cross-sectional view of multiple stacked disks of the rotor disk of FIG. 1A according to various embodiments presented herein;

FIG. 1C is an enhanced view of a portion B of the rotor disk shown in of FIG. 1B according to various embodiments presented herein;

FIG. 1D is a top view of a conductor of the rotor disk shown in of FIG. 1C showing an eddy current control slot according to various embodiments presented herein;

FIG. 2C is a perspective view of a portion D of the laminated sheet winding of FIG. 2B showing an annular conductor area according to various embodiments presented herein;

FIG. 2D is a cross-sectional view of a portion of the laminated sheet winding of FIG. 2C showing a magnetic flux interaction with the laminated sheet winding having an axial flux configuration according to various embodiments presented herein;

FIG. 4A is a perspective view of a radial flux configuration of a laminated sheet winding according to one embodiment presented herein;

FIG. 4B is a cross-sectional view of the laminated sheet winding of FIG. 4A showing the magnetic flux interaction with the laminated sheet winding having a radial flux configuration according to one embodiment presented herein;

DETAILED DESCRIPTION

Figure 2A:
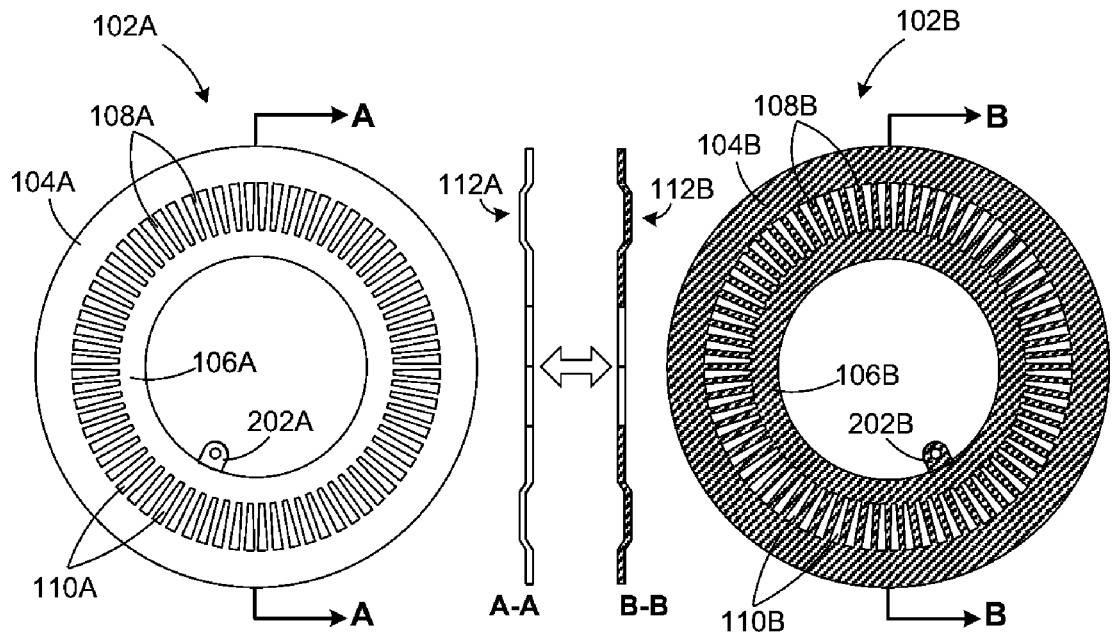
FIG. 2A shows top and cross-sectional views of two rotor disks of a laminated sheet winding according to various embodiments presented herein.

The following detailed description is directed to laminated sheet windings. As discussed briefly above, conventional motor windings utilize copper wire wrapped tightly around an iron core. While effective, these windings are heavy and do not allow for efficient packing of multiple windings due to the nature of the shape of typical iron core windings. Utilizing the concepts and technologies described herein, windings are manufactured using laminated sheets of conductive material, which are electrically isolated from one another, but electrically connected in series, to produce motor windings. These windings may be stacked to a desired thickness for the particular implementation and densely packed with very little air gaps within the windings, increasing the efficiency of the windings over conventional iron-cored windings.

Moreover, because the windings described herein may be made from aluminum or copper sheets, without utilizing an iron core, the weight of the windings, as well as the cost to manufacture the windings, is decreased. This feature is particularly advantageous to the aircraft industry since weight is a significant consideration when used within an aircraft. The laminated sheet windings described below may additionally be configured in axial or radial configurations to accommodate any particular application within a motor.

It should be noted that the term "motor components" may be used below to generically refer to a rotor, a stator, or any combination of rotor and/or stator. It should be appreciated that depending on the particular application, the windings disclosed herein may be utilized to create a rotor or a stator. For example, if manufactured from aluminum, it may be advantageous to utilize the windings described below as a rotor for cooling purposes. However, the windings described herein could also be manufactured from copper or other material, with use in conjunction with augmented cooling techniques such as forced air or liquid cooling.

In the following detailed description, references are made to the accompanying drawings that form a part hereof, and which are shown by way of illustration, specific embodiments, or examples. Referring now to the drawings, in which like numerals represent like elements through the several figures, laminated sheet windings according to axial and radial configurations will be described. FIG. 1A shows a top view of a rotor disk 102 according to one embodiment. As will be described below with respect to FIGS. 2A and 2B, a laminated sheet winding for use as a rotor of an electric motor would include two of these rotor disks 102. For clarity, the features of a single rotor disk 102 will first be described. According to the implementation shown in FIGS. 1A-2D, the rotor disk 102 is configured as a single-phase axial flux sheet winding. In this configuration, the rotor disk 102 will be subjected to a magnetic field located close to a conductor surface, and consequently rotated around a central axis to create the desired torque in the motor. Radial flux sheet winding configurations will be described below with respect to FIGS. 4A-6C.

The rotor disk 102 includes an outer ring 104, an inner ring 106, and a number of conductors 108 spanning between and connecting the outer and inner rings. The conductors 108 are substantially equally spaced around the circumference of the inner ring 106. Conductor apertures 110 are the spaces created between the conductors 108. As will become clear below when discussing the laminated sheet winding created by stacking two rotor disks 102, the conductor apertures 110 are approximately sized according to the dimensions of the conductors 108, so that a conductor 108 of a second rotor disk 102 will fit within the conductor aperture 110 without any significant air gap remaining.

FIG. 1B shows a cross-sectional view of the rotor disk 102 taken along line A-A in FIG. 1A. As seen in this view, the conductors 108 are created along an annular joggle such that the conductor surface 112 defines a plane that is parallel to, but offset from, the plane containing the outer ring 104 and inner ring 106 of the rotor disk 102. It should be appreciated that while the conductor surface 112 is shown and described as being configured in a plane that is parallel to the plane containing the outer ring 104 and inner ring 106, any plane angle may be used for the conductor surface 112 according to the particular implementation of the rotor disk 102. A blown-up view of portion B of the rotor disk 102 shown in FIG. 1B is shown in FIG. 1C. According to this view, it can be seen that the rotor disk 102 is made up of a number of stacked sheets 114 of conductive material. According to one embodiment, the stacked sheets 114 are aluminum.

Aluminum provides a benefit over traditional iron-cored, copper-wrapped windings for several reasons. First, the weight of an aluminum winding according to the concepts described herein is significantly less than that of a comparable conventional winding. As mentioned above, this weight savings provides a significant benefit to the aircraft industry, as well as uses within other vehicles or any other application in which weight is a design issue.

Aluminum is typically purposefully avoided for applications within electric motors. The reason for this is that aluminum has a higher resistance than other commonly used conductive materials, which equates to aluminum heating up more than conventional materials. However, because the concepts described herein utilizing the laminated sheet windings within a spinning rotor, the resulting airflow over the rotor provides sufficient cooling to sustain operations. Aluminum is also a material that is commonly used in the aircraft industry. The manufacturing process utilized to cut, bend, weld, electrically isolate, and otherwise manipulate aluminum is already supported, facilitating the manufacturing of aluminum sheet windings. While the various embodiments described herein are discussed in the context of the use of aluminum on a spinning rotor, it should be understood that copper or other conductive materials may alternatively be used. Moreover, the laminated sheet winding concepts described herein may be alternatively used on a stator, with force, liquid, or other cooling techniques.

As seen in FIG. 1C, the stacked sheets 114 are electrically connected in series via welds 116. According to one embodiment, prior to stacking, each sheet 114 is anodized or otherwise electrically isolated to prevent current from passing between sheets other than at the designated weld locations at the ends of the disk 102. When stacked, a sheet 114 is alternately welded to a lower sheet at one end of the rotor disk 102 and to an upper sheet at the opposing end of the rotor disk 102 to electrically connect the sheets 114 in series to create a winding that has a very small air gap between the sheets 114, which are equivalent to conventional enameled wire. This configuration is extremely efficient, effectively reducing the size and weight of the resulting motor.

It should be noted that the welds 116 shown on the lower end of FIG. 1C are shown in broken lines since they are shown for demonstrative purposes only to illustrate the series connections and are not necessarily indicative of actual locations of the welds 116. The welds 116 may be located on opposing outer ends of the rotor disk 102, which are not shown in FIG. 1C. It should also be appreciated that any other means for electrically connecting the stacked sheets 114 in series may be used. Welding aluminum provides an advantage over soldering due to the reliability of the connection and to manage the forces present within the rotor disk 102 during rotation in a high speed motor, but any suitable methods for establishing the electrical connection may be employed.

It should also be understood that the concepts disclosed herein are not limited to the number of sheets 114 shown in any of the accompanying drawings. Rather, the precise number of sheets 114 used within a rotor disk 102 or any other component disclosed herein could vary according to the particular application and the desired thickness of the resulting winding with consideration to the magnetic flux production capabilities associated with the conductor and the desired output of the corresponding motor.

Figure 2B:
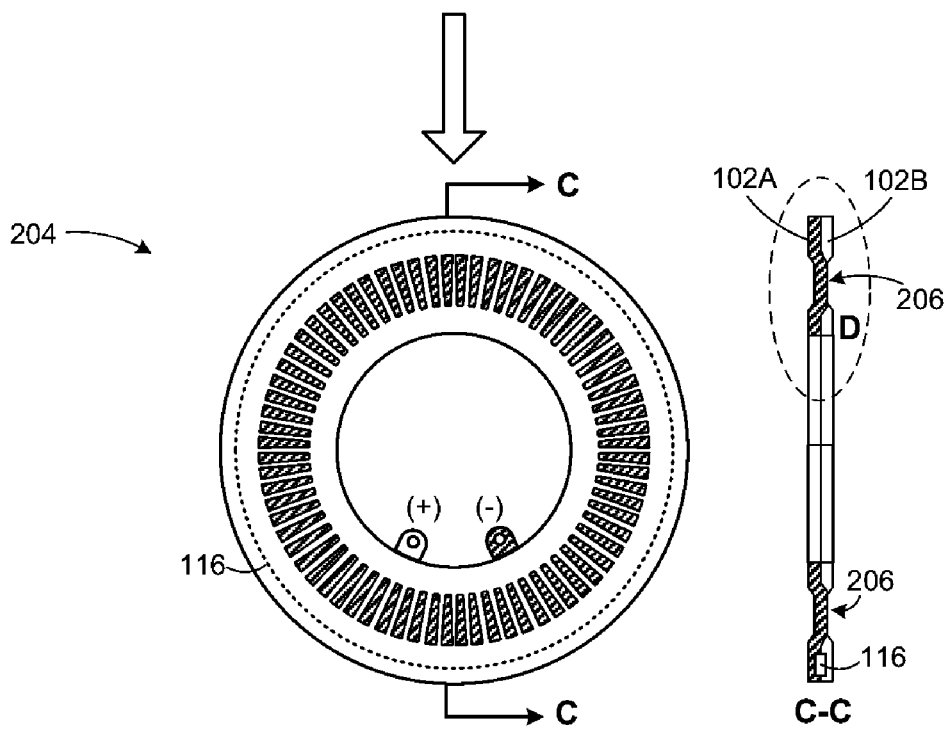
FIG. 2B shows top and cross-sectional views of a laminated sheet winding according to an axial flux configuration created by combining the two rotor disks of FIG. 2A according to various embodiments presented herein.

FIG. 1D shows a top view of the conductor surface 112. According to various embodiments, one or more eddy current control slots 118 may be cut into a conductor 108 in order to minimize eddy currents created by the high speed rotation of the rotor disk 102. Turning now to FIGS. 2A and 2B, the combination of two rotor disks 102 to create a laminated sheet winding will be shown and described. FIG. 2A shows two rotor disks 102A and 102B, respectively, having outer rings 104A and 104B, inner rings 106A and 106B, conductors 108A and 108B, and conductor apertures 110A and 110B, respectively. Each disk additionally includes a terminal 202A and 202B, respectively, which will serve as the positive and negative terminals for the laminated sheet winding.

According to one embodiment, each rotor disk 102 is identical. When the two rotor disks 102A and 102B are stacked on top of one another and electrically connected in series, the laminated sheet winding 204 shown in FIG. 2B is created. As seen in the cross-sectional views along lines A-A and B-B of FIG. 2A, the rotor disk 102A is oriented such that the conductor surface 112A corresponds to an annular portion of the disk 102A that is joggled in one direction, while the conductor surface 112B corresponds to an annular portion of the disk 102B that is joggled in an opposite direction. As previously indicated, identical rotor disks 102 may be used, with one turned upside down with respect to the other.

As seen in FIG. 2B, the rotor disk 102A may be placed on top of the rotor disk 102B with the conductors 108A of rotor disk 102A fitting within the conductor apertures 110B of rotor disk 102B. Likewise, the conductors 108B of rotor disk 102B rest within the conductor apertures 110A of rotor disk A. After welding or soldering the two rotor disks together, the result is a high density, thin conductor area 206, as seen in the cross-sectional view of the laminated sheet winding 204 along line C-C of FIG. 2B.

A blown-up perspective view of portion D of the laminated sheet winding 204 shown in FIG. 2B is shown in FIG. 2C. The thin conductor area 206 can be clearly seen between the outer rings 104A and 104B and the inner rings 106A and 106B. According to this embodiment, the thickness of the outer ring of the laminated sheet winding, which includes the outer ring 104A and 104B of the rotor disks 102A and 102B, respectively, is approximately double the thickness of the conductor area 206, although this disclosure is not limited to any particular thickness or thickness ratio of the conductor area 206 to the remaining portions of the laminated sheet winding 204. By offsetting the conductors 108 and creating the conductor apertures 110, two rotor disks 102 may be secured together to create a high density, thin conductor area 206 that provides a substantially continuous conductor surface for interaction with the magnetic flux from the magnets 210 of the stator 212, as shown in FIG. 2D.

The manufacturing process for the axial flux laminated sheet winding 204 will now be described. A number of rotor disks templates may be cut from a single sheet of aluminum using water jet or other cutting technologies. Either before or after cutting these templates, the annular joggle may be added to create the offset conductor surface 112. This joggle may be added by pressing the sheet into a form or via other known techniques. Each rotor disk template may then be anodized, masking off the weld locations at which the laminated sheets 114 will be electrically connected in series. Non-conductive thin films may also be used to electrically isolate copper sheets. The desired number of rotor disks templates are stacked together and welded at the appropriate locations to create the rotor disk 102. Two rotor disks 102 may then be stacked and secured together, with one upside down with respect to the other, to create the laminated sheet winding 204 with the thin conductor area 206.

Figure 3A:
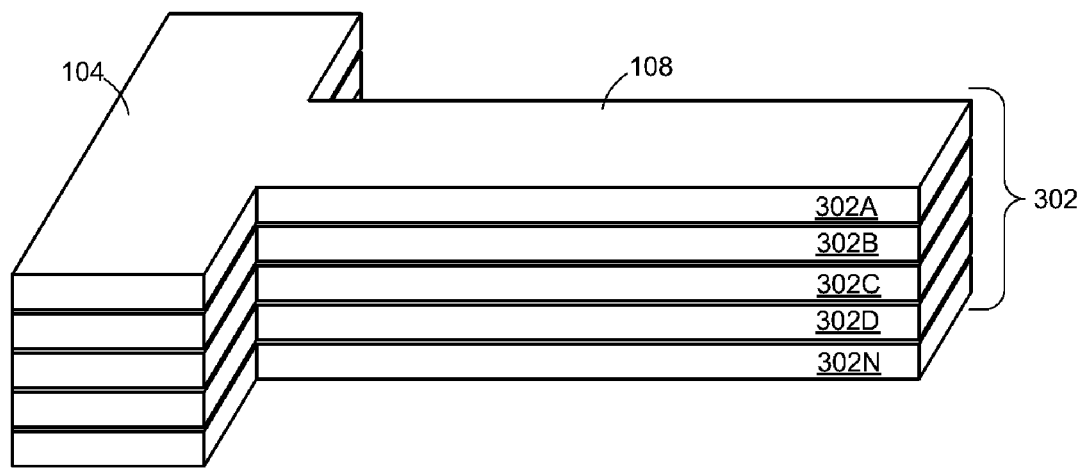
FIG. 3A is a perspective view of an outer ring and conductor portion of a laminated sheet winding showing stacked laminated sheets horizontally isolated according to various embodiments presented herein.
Figure 3B:
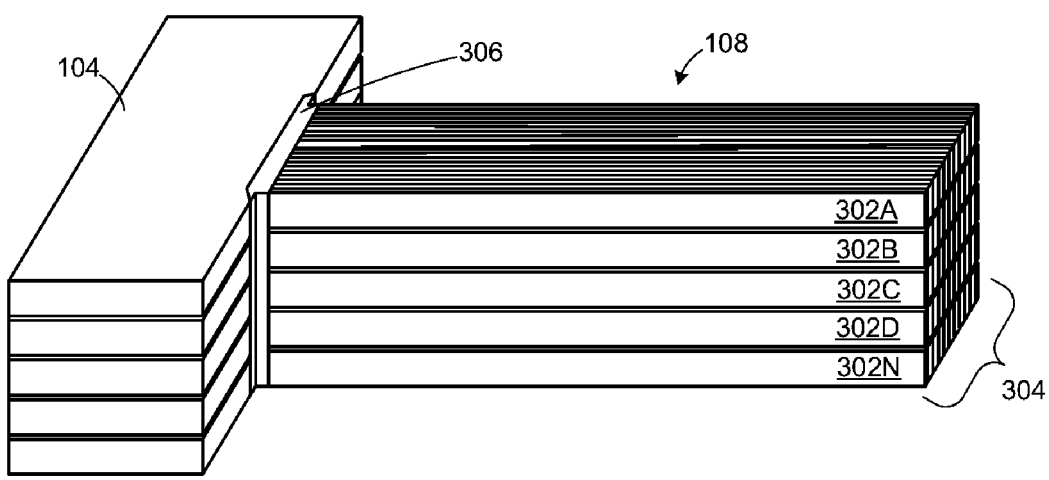
FIG. 3B is a perspective view of an outer ring and conductor portion of a laminated sheet winding showing both horizontally and vertically laminated sheets according to various embodiments presented herein.

FIG. 3A shows a portion of a rotor disk 102 that includes the outer ring 104 and a conductor 108. This simplified view illustrates, without the joggle that offsets the conductor 108, a stack of horizontally laminated sheets 302A-302N (collectively 302). Each of the horizontally laminated sheets may originate as a single rotor disk template cut from a single sheet of aluminum. In contrast, FIG. 3B shows an alternative configuration for the conductors 108 in which each conductor 108 is created using a stack of horizontally laminated sheets 302, with each horizontally laminated sheet made up of a number of vertically laminated sheets 304. In this embodiment, the vertically laminated sheets 304 serve as an effective technique for minimizing eddy currents produced by high speed rotation of the rotor. The conductors 108 may each be connected to the outer ring 104 and inner ring 106 to create the rotor disk 102. Any resistance welding or other techniques may be used to create the weld 306 that secures the conductors 108 in place.

Turning now to FIG. 4A, a radial flux laminated sheet winding 404 will be described in detail. According to one embodiment, the radial flux winding includes an outer rotor, or motor component, 402A and an inner rotor, or motor component, 402B. The outer rotor 402A and the inner rotor 402B may each be created in a similar manner as the rotor disks 102 described above, utilizing stacked sheets of aluminum or other conductive material. Once cut from a flat sheet and stacked, the outer rotor 402A and inner rotor 402B may be rolled, bent, or otherwise formed via known techniques into the cylindrical radial flux configuration shown in the figure in which the inner rotor 402B is nested within the outer rotor 402A. In this configuration, the conductors 408A and 408B (collectively 408) of each rotor are positioned within corresponding conductor apertures 410A and 410B (collectively 410) of the other rotor. The resulting cylindrical shape positions the conductors 408 in a position that is normal to a radial axis of the winding.

FIG. 4B shows a cross-sectional view taken along line A-A of the radial flux laminated sheet winding 404 configured as a rotor. Magnets 412 of a stator have been included to illustrate the interaction between outer surface of the winding having the conductors 408 and a stator with the magnets 412. As the radial flux laminated sheet winding 404 rotates, the conductors 408 move through the magnetic fields produced by the magnets 412. Because the conductors 408A and 408B are substantially coplanar with adjacent conductors 408 due to the positioning within corresponding conductor apertures 410, the conductor area of the winding is relatively thin with a high density of conductor windings. This allows the magnetic field to penetrate the conductors fully without having to extend far.

Figure 5:
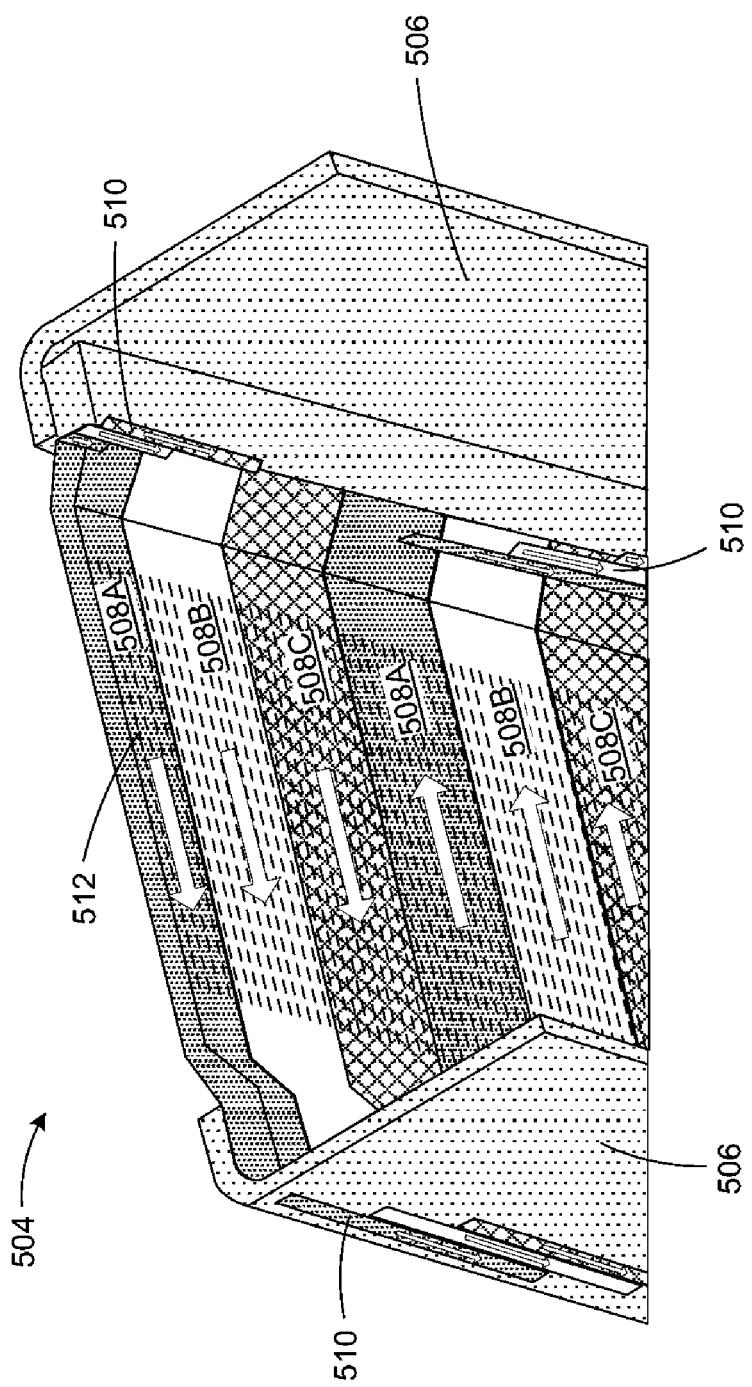
FIG. 5 is a perspective cross-sectional view of a 3-phase radial flux laminated sheet winding according to an alternative embodiment presented herein.

FIG. 5 shows another embodiment in which the radial flux laminated sheet winding 504 is created using two opposing non-conductive end annular end connectors 506 connected to a central hub. Alternating conductors 508A-508C (collectively 508) of separate conductor sheets bridge the end connectors 506, each conductor 508 extending spanwise across the gap between the end connectors 506 and connected at opposing ends to the end connectors 506. The term conductor sheet in this context refers to all conductors 508 that are electrically connected in series. For example, in this embodiment, there are three conductor sheets corresponding to three phases of power. The first conductor sheet includes all conductors 508A. The second conductor sheet includes conductors 508B. The third conductor sheet includes conductors 508C. As shown in FIG. 5, the conductors 508 abut one another along a spanwise edge and alternate between sheets. For example, conductor 508A abuts conductor 508C at a front spanwise edge and conductor 508B at a rear spanwise edge. Conductor 508B similarly abuts connector 508A at a front spanwise edge and connector 508C at a rear spanwise edge.

According to this embodiment, the conductors 508 direct the current in a single spanwise direction from one side of the conductor 508 at an end connector 506, across the conductor 508 to the other side at the opposing end connector 506. For illustrative purposes, arrows on the conductors 508 indicate direction of travel of the electrical current. At the end connectors 506, wiring 510 electrically connects the conductors 508 to the next conductor 508 of the same conductor sheet. As seen in the figure, current passes from right to left through the first conductor 508A. The current then flows through the wiring 510 at the end connector 506 to the next conductor 508A, where it is directed back across the conductor from left to right to the opposing end connector 506. The current traverses back and forth, alternating direction from one conductor 508 of a conductor sheet to the next conductor 508 of the conductor sheet within a given phase.

According to this embodiment, the conductors 508 may be laminated stacks of material that create eddy current control slots 512 between sheet laminations in order to minimize eddy currents created by the high rotational velocity of the rotor. Magnets are located concentrically on the outside of the conductors 508 to create a magnetic flux radially inward. A portion of the conductors 508 cross this flux in the axial direction to produce force on the conductors in the circumferential direction, thus producing torque. Current may be routed to the conductors 508 near the central hub through slip rings. Because there are three conductor sheets corresponding to conductors 508A, 508B, and 508C, respectively, the rotation of the radial flux laminated sheet winding 504 through the magnetic flux creates a three-phase power system.

The ironless design of the embodiments described herein means that winding inductance is significantly smaller than of a traditional design. Consequently, when the magnetic field collapses, energy does not discharge by arcing to the brushes as it does when stored in an iron-cored motor then suddenly released via commutation. As a result, the wear rate of the slip ring brush is minimal and the slip rings will have an increased life span as compared to conventional iron-cored systems. Because inductance also has a negative effect on the initial development of torque, an ironless rotor can reach maximum torque faster than with conventional iron-cored rotors, which is beneficial to applications in which maximum responsiveness of the motor is important. Also, because the aluminum rotor is of significantly lower density, it will possess much less rotational inertia than spinning heavier copper or magnets.

Figure 6A:
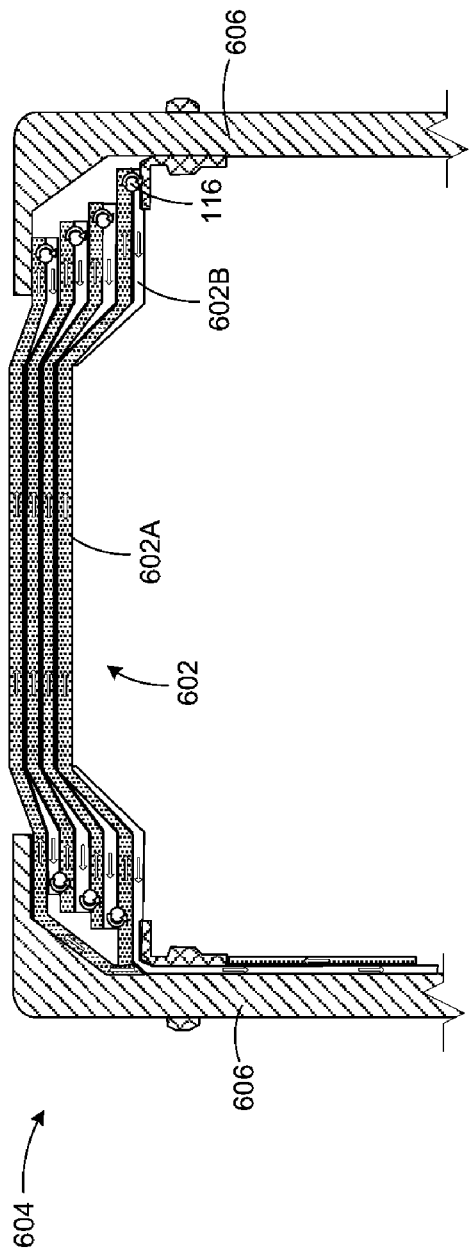
FIG. 6A is a cross-sectional view of yet another radial flux laminated sheet winding according to an alternative embodiment presented herein.

Looking now at FIGS. 6A-6C, an alternative radial flux laminated sheet winding 604 will be described. FIG. 6A shows a cross-sectional view of a radial flux rotor in which end connectors 606 attached to a central hub (not shown) are used to secure conductor sheets 602 in place in a radial flux configuration. FIG. 6B shows an exploded view of the conductor sheets 602. As seen in FIGS. 6A and 6B, according to this embodiment, the conductor sheets include two basic sheets, 602A and 602B, alternately stacked to a desired thickness based on the particular application for which the winding 604 will be used.

Figure 6C:
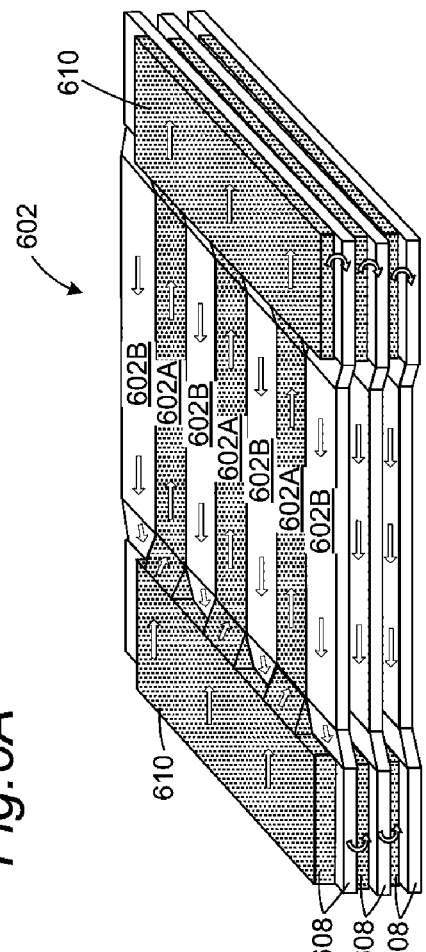
FIG. 6C is a perspective view of a laminated sheet winding stack utilized within the laminated sheet winding of FIG. 6A according to one embodiment presented herein.
Figure 6B:
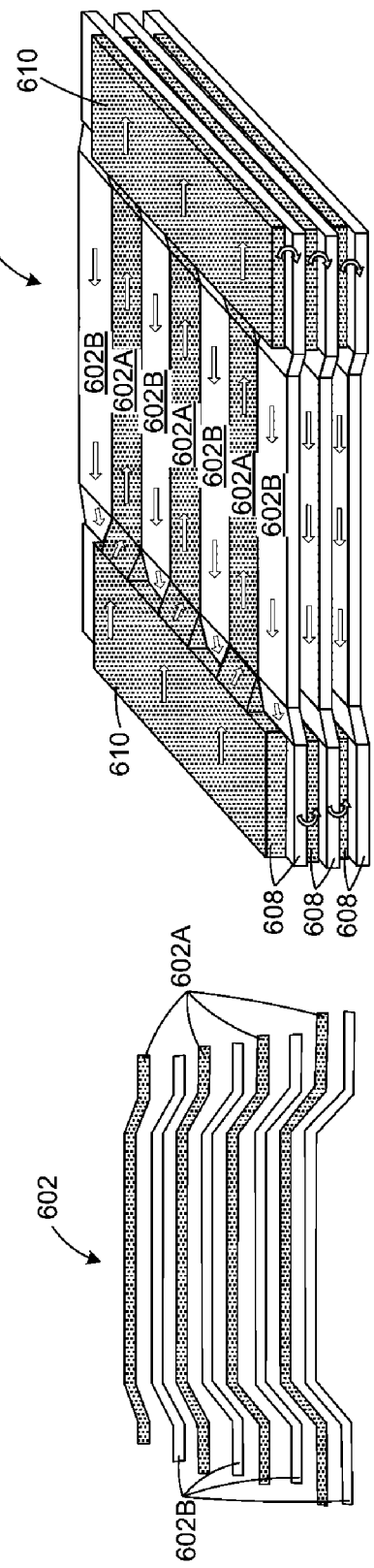
FIG. 6B is a cross-sectional exploded view of the laminated sheets of the radial flux laminated sheet winding of FIG. 6A according to one embodiment presented herein.

As seen in FIG. 6C, the conductor sheets may be stacked according to conductor sheet pairs 608. A conductor sheet pair 608 includes a conductor sheet 602A and a conductor sheet 602B stacked together in a similar manner as the rotor disks 102A and 102B described above with respect to FIGS. 2B and 2C. The conductor sheet 602A has any number of parallel conductors 602A, which are offset from the plane of the end portions 610 and spaced apart to create the conductor apertures. The conductor sheet 602B is of similar design as conductor sheet 602A and is electrically connected to conductor sheet 602A at one end to create a series connection. When mated together, the conductor sheets 602A and 602B form a conductor sheet pair 608. Any number of conductor sheet pairs 608 may be stacked and connected in series via welds 116 to create the desired winding.

Figure 7:
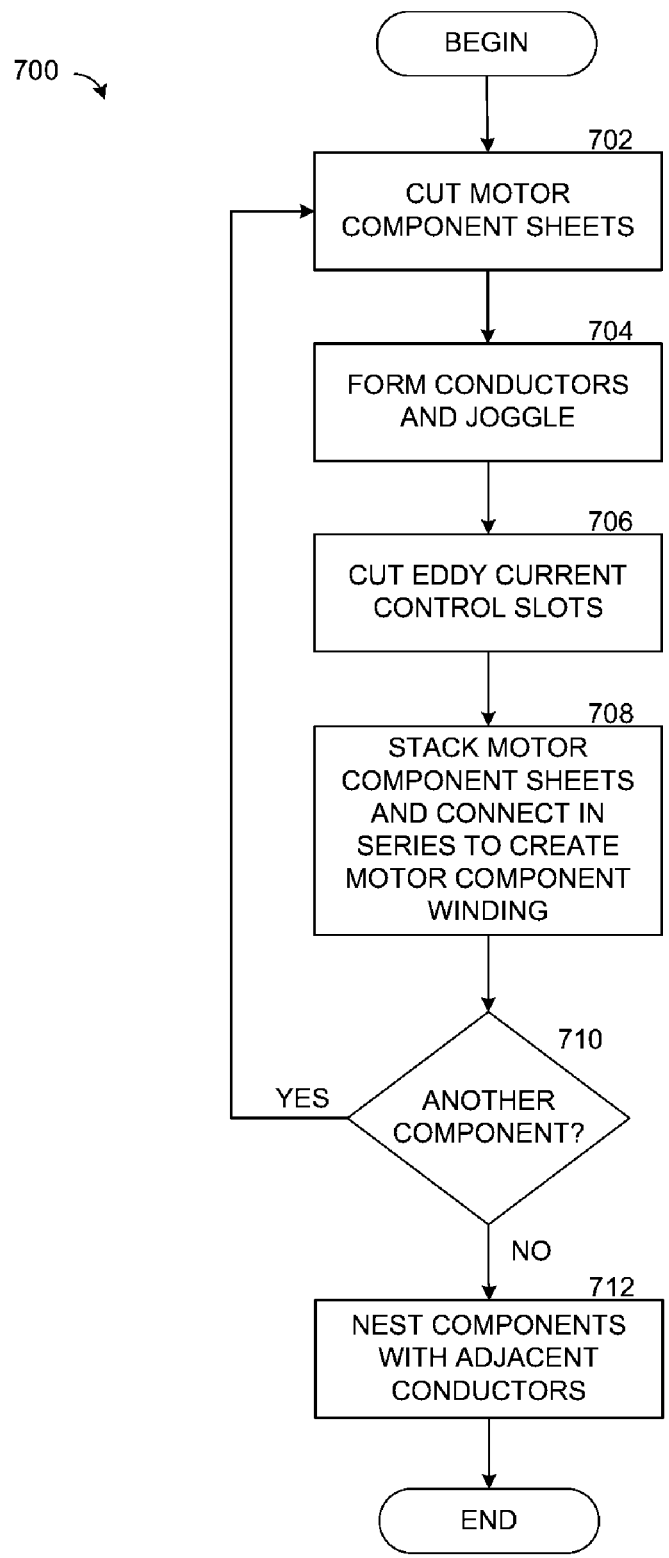
FIG. 7 is a flow diagram illustrating a method for manufacturing an ironless core laminated sheet winding according to one embodiment presented herein.

Turning now to FIG. 7, an illustrative routine 700 for manufacturing an ironless core laminated sheet winding 204/404 will now be described in detail. It should be appreciated that more or fewer operations may be performed than shown in the FIG. 7 and described herein. Moreover, these operations may also be performed in a different order than those described herein. The routine 700 begins at operation 702, where the applicable number of motor component sheets, such as rotor disks 102, are cut from a sheet of aluminum or other suitable conductive material. These sheets may be cut using water jet or other cutting technologies. The motor component sheets may be cut as one-piece components, or may include outer rings, inner rings, and conductors that are separately cut and combined in the manner described above.

From operation 702, the routine 700 continues to operation 704, where the conductors, such as conductors 108/408, are cut or otherwise formed. As described above, conductor apertures may be cut from the motor components to create the conductors, or the conductors may be formed using horizontally laminated sheets 302 or vertically laminated sheets 304. The conductors may be joggled by pressing or otherwise offsetting a portion of the motor component sheets containing the conductors so that the conductor surface 112 of the resulting motor component is substantially coplanar, providing a relatively continuous conductor surface. At operation 706, eddy current control slots 118 may be cut into the surface of the conductors to control losses via eddy currents during high speed rotation of the motor components.

The routine 700 continues from operation 706 to operation 708, where the motor component sheets are stacked according to a desired characteristic or parameter of the resulting winding and electrically connected in series to create the motor component winding. It should be appreciated that the motor component sheets may be anodized or otherwise electrically isolated from one another at abutting surfaces so as to prevent current flow between sheets except at the desired location where the sheets are welded to provide the electrical connection in series.

A determination is made at operation 710 as to whether another motor component is to be made. For example, multiple rotor disks 102 may be stacked to create a laminated sheet winding as described above. Similarly, outer and inner rotors 402A and 402B, respectively, may be created and nested together to create the laminated sheet winding. If an additional motor component is to be manufactured at operation 710, then the routine 700 returns to operation 702 and continues as described above. However, if no additional motor components are to be made at operation 710, then the routine 700 continues to operation 712, where the motor components are nested together with the conductors of one component positioned within corresponding conductor apertures of the other component to create the laminated sheet winding, and the routine 700 ends.

Figure 8:
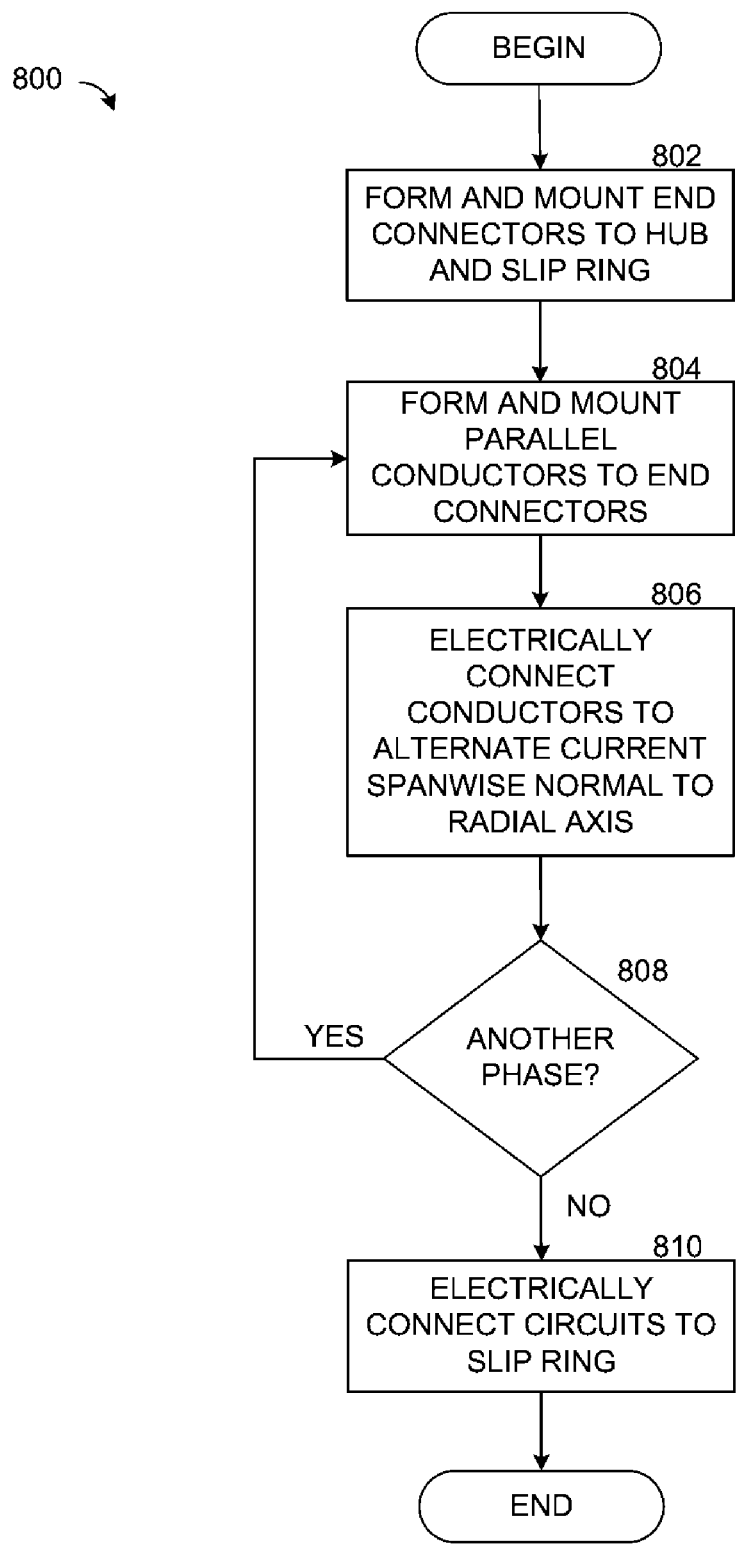
FIG. 8 is a flow diagram illustrating a method for manufacturing an ironless core laminated sheet winding according to another embodiment presented herein.

Turning to FIG. 8, an illustrative routine 800 for manufacturing an ironless core laminated sheet winding 504/604 will now be described in detail. The routine 800 begins at operation 802, where the annular end connectors 506/606 are mounted to a central hub or are formed with the central hub. As described above, the end connectors are created from a non-conductive material. A slip ring or other means for transferring electricity from the rotating laminated sheet winding to a static circuit may be attached to the central hub.

From operation 802, the routine 800 continues to operation 804, where the conductors 508/602 are cut or otherwise formed from conductive material like aluminum. As described above, the conductors 508 may be formed from laminated stacks of material to create eddy current control slots 512 between sheet laminations in order to minimize eddy currents created by the high rotational velocity of the rotor. The conductors 602 may be cut from a sheet in similar manner as described above with respect to conductors 108. The conductors 508/602 are mounted to the end connectors in a parallel configuration normal to the radial axis of the end connectors 506/606 and abutting one another along the spanwise edges of the conductors.

The routine 800 continues from operation 804 to operation 806, where the conductors 508/602 are electrically connected such that the current is directed spanwise, normal to the radial axis, such that it alternates in direction with each consecutive conductor. At operation 808, a determination is made as to whether another circuit corresponding to another phase is to be added to the laminated sheet winding. If so, then the routine 800 returns to 804 and proceeds until all conductor sheets have been added. Once the appropriate conductor sheets have been installed, then the circuits corresponding to each phase are electrically connected to the slip ring at the central hub at operation 810, and the routine 800 ends.

It should be clear from the above disclosure that the laminated sheet windings described herein and encompassed by the claims below provide advantages over conditional windings. The magnetic air gap is reduced within the windings due to the high density winding characteristics of the laminated sheet windings described herein. These denser windings are robust, being welded together, allowing increased tolerance to high speed operation and improving the reliability of the connections. The windings described herein are easy to install and replace, as there is no magnetic attraction between the rotor and stator, and the unitized construction has significantly improved crash-worthiness when used in an aircraft or vehicle application as compared to conventional wound coils.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An ironless core laminated sheet winding, comprising:
   a first motor component comprising a first plurality of stacked sheets of conductive material, the first plurality of stacked sheets electrically connected in series to create a first sheet winding; and
   a second motor component comprising a second plurality of stacked sheets of conductive material, the second plurality of stacked sheets electrically connected in series to create a second sheet winding,
   wherein the first motor component comprises a plurality of first conductors and a plurality of first apertures positioned between the plurality of first conductors,
   wherein the second motor component comprises a plurality of second conductors and a plurality of second apertures positioned between the plurality of second conductors, and
   wherein the first motor component and the second motor component are configured such that the first conductors are positioned within the second apertures and the second conductors are positioned within the first apertures and electrically terminated such that the first motor component and the second motor component are configured as alternating poles.

2. The ironless core laminated sheet winding of claim 1, wherein the first motor component comprises a substantially circular shape having a first outer ring, a first inner ring, and the plurality of first conductors bridging the first outer ring and the first inner ring,
   wherein the second motor component comprises a substantially circular shape having a second outer ring, a second inner ring, and the plurality of second conductors bridging the first outer ring and the first inner ring, and
   wherein the plurality of first conductors comprises a downward joggle with respect to the first outer ring and the first inner ring, and the plurality of second conductors comprises an upward joggle with respect to the second outer ring and the second inner ring, such that when the first motor component is secured to the second motor component, the first conductors and the second conductors are substantially coplanar and create an axial flux conductor configuration.

3. The ironless core laminated sheet winding of claim 2, wherein each sheet of the first plurality of stacked sheets of the plurality of first conductors comprises a plurality of first vertically laminated sheets, and wherein each sheet of the second plurality of stacked sheets of the plurality of second conductors comprises a plurality of second vertically laminated sheets.

4. The ironless core laminated sheet winding of claim 1, wherein the conductive material comprises aluminum, wherein each of the first plurality of stacked sheets and each of the second plurality of stacked sheets are electrically isolated from adjacent sheets via anodizing or thin sheet isolation, and wherein adjacent sheets are alternately welded together at opposing ends to electrically connect the stacked sheets in series.

5. The ironless core laminated sheet winding of claim 1, wherein the plurality of first conductors and the plurality of second conductors comprise a plurality of eddy current control slots.

6. The ironless core laminated sheet winding of claim 1,
wherein the first motor component comprises an outer motor component configured in a cylindrical configuration such that the first conductors are configured normal to a radial axis, and
wherein the second motor component comprises an inner motor component configured to nest within the outer motor component such that the first conductors are positioned within the second apertures and the second conductors are positioned within the first apertures to create a radial flux configuration.

7. An ironless core radial flux motor system, comprising:
a pair of opposing annular end connectors fixed to a central hub;
a first conductor sheet comprising opposing edges and a first plurality of parallel conductors spanning between the opposing edges with a first plurality of conductor apertures between the first plurality of parallel conductors, wherein the first conductor sheet forms a circular motor component with the first plurality of parallel conductors configured normal to a radial axis of the circular motor component; and
a second conductor sheet comprising opposing edges and a second plurality of parallel conductors spanning between the opposing edges with a second plurality of conductor apertures between the second plurality of parallel conductors,
wherein the second conductor sheet is mounted to an inner side of the first conductor sheet and electrically connected in series such that the first plurality of parallel conductors are positioned within the second plurality of conductor apertures and the second plurality of parallel conductors are positioned within the first plurality of conductor apertures such that adjacent conductors from the first plurality of parallel conductors and the second plurality of parallel conductors create a substantially continuous outer conductor surface.

8. The ironless core radial flux motor system of claim 7, wherein the first conductor sheet and the second conductor sheet comprises a conductor sheet pair, and wherein the ironless core radial flux motor system further comprises a plurality of conductor sheet pairs connected in series according to a desired winding thickness corresponding to a desired motor performance characteristic.

9. The ironless core radial flux motor system of claim 7, wherein each of the first conductor sheet and the second conductor sheet is electrically connected to the central hub via one or more slip rings operative to transfer power between the first and second conductor sheets and the central hub.

10. The ironless core radial flux motor system of claim 7, wherein each of the first conductor sheet and the second conductor sheet is anodized to electrically isolate the conductor sheet from an adjacent conductor sheet or motor system component, wherein the second conductor sheet is welded to the first connector sheet at one end to create an electrical connection between the sheets, and wherein the first and second conductor sheets comprise aluminum or copper.

11. An ironless core radial flux motor system, comprising:
a pair of opposing annular end connectors fixed to a central hub;
a first conductor sheet comprising opposing edges and a first plurality of parallel conductors spanning between the opposing edges with a first plurality of conductor apertures between the first plurality of parallel conductors, wherein the first conductor sheet forms a circular motor component with the first plurality of parallel conductors configured normal to a radial axis of the circular motor component; and
a second conductor sheet comprising opposing edges and a second plurality of parallel conductors spanning between the opposing edges with a second plurality of conductor apertures between the second plurality of parallel conductors,
wherein the second conductor sheet is mounted to the pair of opposing annular end connectors adjacent to the first conductor sheet within a conductor aperture of the first plurality of conductor apertures such that each conductor of the second plurality of parallel conductors abuts one of the first plurality of parallel conductors along a spanwise edge of the conductor,
wherein the first plurality of parallel conductors are configured to conduct electrical current in a spanwise direction normal to the radial axis of the circular motor component, alternating the direction with each consecutive conductor of the first plurality of parallel conductors, and
wherein the second plurality of parallel conductors are configured to conduct electrical current in a spanwise direction normal to the radial axis of the circular motor component, alternating the direction with each consecutive conductor of the second plurality of parallel conductors.

12. The ironless core radial flux motor system of claim 11, further comprising:
a third conductor sheet comprising opposing edges and a third plurality of parallel conductors spanning between the opposing edges with a third plurality of conductor apertures between the second plurality of parallel conductors,
wherein the third conductor sheet is mounted to the pair of opposing annular end connectors adjacent to the second conductor sheet within a conductor aperture of the first and second plurality of conductor apertures such that each conductor of the third plurality of parallel conductors abuts one of the second plurality of parallel conductors along a front spanwise edge of the conductor and abuts one of the first plurality of parallel conductors along a rear spanwise edge of the conductor.

13. The ironless core radial flux motor system of claim 11, wherein each of the first conductor sheet and the second conductor sheet is electrically connected to the central hub via one or more slip rings operative to transfer power between the first and second conductor sheets and the central hub.

14. The ironless core radial flux motor system of claim 11, wherein the first and second conductor sheets comprise aluminum or copper, wherein the first and second conductor sheets comprise anodized laminated sheets configured such that sheet laminations create a plurality of eddy current control slots configured spanwise between the opposing annular end connectors.

15. A method for manufacturing an ironless core laminated sheet winding, the method comprising:
cutting a first plurality of motor component sheets out of conductive material;
forming a plurality of first conductors within each of the first plurality of motor component sheets such that the plurality of first conductors are spaced apart with a plurality of first apertures between the plurality of first conductors;
laminating the first plurality of motor component sheets together in a stacked configuration according to a desired winding parameter to create a first motor component;
electrically connecting the first plurality of motor component sheets in series;
cutting a second plurality of motor component sheets out of conductive material;
forming a plurality of second conductors within each of the second plurality of motor component sheets such that the plurality of second conductors are spaced apart with a plurality of second apertures between the plurality of second conductors;
laminating the second plurality of motor component sheets together in a stacked configuration according to a desired winding parameter to create a second motor component;
electrically connecting the second plurality of motor component sheets in series; and
securing the first motor component to the second motor component such that the plurality of first conductors are positioned within the plurality of second apertures and the plurality of second conductors are positioned within the plurality of first apertures and electrically terminated such that the first motor component and the second motor component are configured as alternating poles.

16. The method of claim 15, wherein cutting the first plurality of motor component sheets and the second plurality of motor component sheets out of conductive material comprises utilizing a water jet to cut each motor component sheet out of a sheet of aluminum.

17. The method of claim 15,
wherein cutting the first plurality of motor component sheets out of the conductive material comprises cutting a plurality of first outer rings and a plurality of first inner rings,
wherein forming the plurality of first conductors within the first plurality of motor component sheets comprises cutting the plurality of first conductors out of the conductive material such that the plurality of first conductors connects the plurality of first outer rings to the plurality of first inner rings such that the plurality of first conductors are evenly spaced around a circumference of the first inner rings with the plurality of first apertures between,
wherein cutting the second plurality of motor component sheets out of the conductive material comprises cutting a plurality of second outer rings and a plurality of second inner rings, and
wherein forming the plurality of second conductors within the second plurality of motor component sheets comprises cutting the plurality of second conductors out of the conductive material such that the plurality of second conductors connects the plurality of second outer rings to the plurality of second inner rings such that the plurality of second conductors are evenly spaced around a circumference of the second inner rings with the plurality of second apertures between.

18. The method of claim 17, further comprising:
forming an annular joggle within the first motor component between the first outer ring and the first inner ring such that the first conductors are offset from a plane of the first motor component; and
forming an annular joggle within the second motor component between the second outer ring and the second inner ring such that the second conductors are offset from a plane of the second motor component,
wherein the first conductors and the second conductors are substantially coplanar when the first motor component is secured to the second motor component.

19. The method of claim 15, wherein cutting the first plurality of motor component sheets out of the conductive material comprises cutting a plurality of first outer rings and a plurality of first inner rings,
wherein forming the plurality of first conductors within the first plurality of motor component sheets comprises for each of the plurality of first conductors,
forming a plurality of vertically laminated sheets,
stacking the plurality of vertically laminated sheets to create a first conductor,
electrically connecting the plurality of vertically laminated sheets in series, and
connecting the first conductor to the plurality of first outer rings and to the plurality of first inner rings such that the plurality of first conductors are evenly spaced around a circumference of the first inner rings with the plurality of first apertures between, and
wherein forming the plurality of second conductors within the second plurality of motor component sheets comprises for each of the plurality of second conductors,
forming a plurality of vertically laminated sheets,
stacking the plurality of vertically laminated sheets to create a second conductor,
electrically connecting the plurality of vertically laminated sheets in series, and
connecting the second conductor to the plurality of second outer rings and to the plurality of second inner rings such that the plurality of second conductors are evenly spaced around a circumference of the second inner rings with the plurality of second apertures between.

20. The method of claim 15, further comprising cutting one or more eddy current control slots within one or more first conductors and within one or more second conductors.

21. The method of claim 15, further comprising:
forming the first motor component into a cylindrical configuration such that the plurality of first conductors are configured normal to a radial axis of the cylindrical configuration, and
forming the second motor component into a cylindrical configuration such that the plurality of second conductors are configured normal to the radial axis and nesting the second motor component within the first motor component such that the first conductors are positioned within the second apertures and the second conductors are positioned within the first apertures to create a radial flux configuration.

22. A method for manufacturing an ironless core laminated sheet winding, the method comprising:
mounting a pair of opposing annular end connectors to a central hub;

mounting a first plurality of parallel conductors to the pair of opposing annular end connectors such that the first plurality of parallel conductors are configured normal to a radial axis of the pair of opposing annular end connectors;

mounting a second plurality of parallel conductors to the pair of opposing annular end connectors adjacent to the first plurality of parallel conductors such that each conductor of the second plurality of parallel conductors abuts one of the first plurality of parallel conductors along a spanwise edge of the conductor;

electrically connecting the first plurality of parallel conductors to conduct electrical current in a spanwise direction normal to the radial axis, alternating the direction with each consecutive conductor of the first plurality of parallel conductors; and electrically connecting the second plurality of parallel conductors to conduct electrical current in a spanwise direction normal to the radial axis, alternating the direction with each consecutive conductor of the second plurality of parallel conductors.

23. The method of claim 22, further comprising:

mounting a third plurality of parallel conductors to the pair of opposing annular end connectors adjacent to the second plurality of parallel conductors such that each conductor of the third plurality of parallel conductors abuts one of the second plurality of parallel conductors along a front spanwise edge of the conductor and abuts one of the first plurality of parallel conductors along a rear spanwise edge of the conductor; and electrically connecting the third plurality of parallel conductors to conduct electrical current in a spanwise direction normal to the radial axis, alternating the direction with each consecutive conductor of the third plurality of parallel conductors, wherein the first plurality of parallel conductors, the second plurality of parallel conductors, and the third plurality of parallel conductors form a three-phase power system operative to create three-phase alternating current when rotated within one or more magnetic fields.

* * * * *